Jan. 5, 1943.   W. E. MENERAY   2,307,529
BEAN GRADER AND SPREADER
Filed Feb. 14, 1942   4 Sheets-Sheet 4
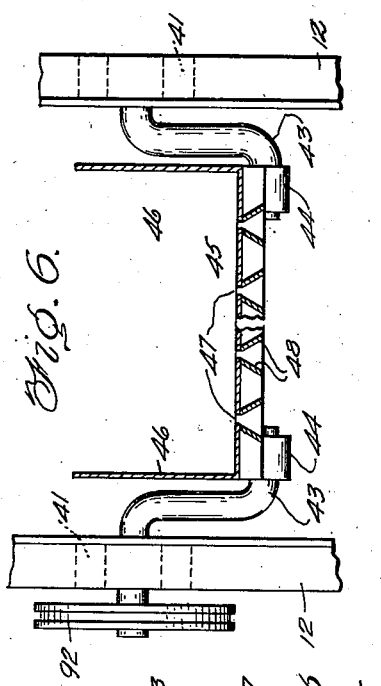
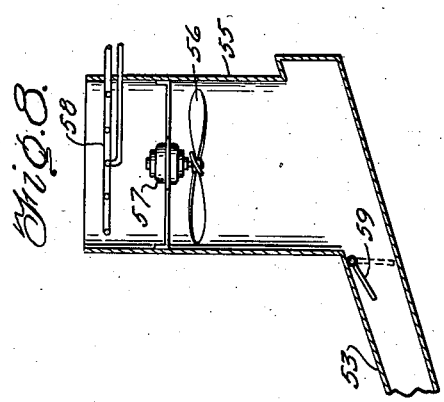
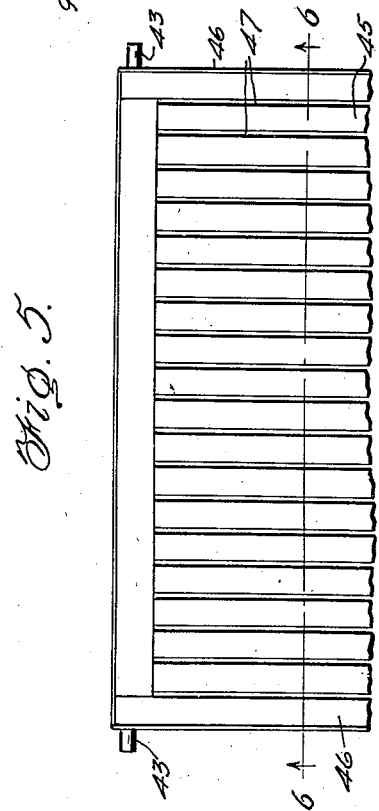
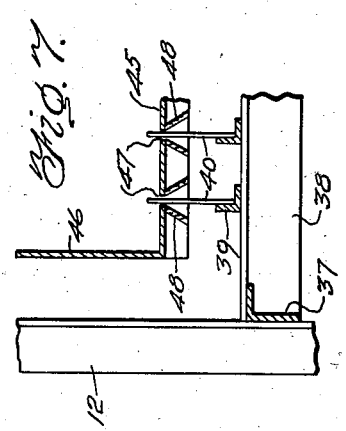
Inventor,
Wallace E. Meneray,
By Frank S. Appleman,
Attorney.

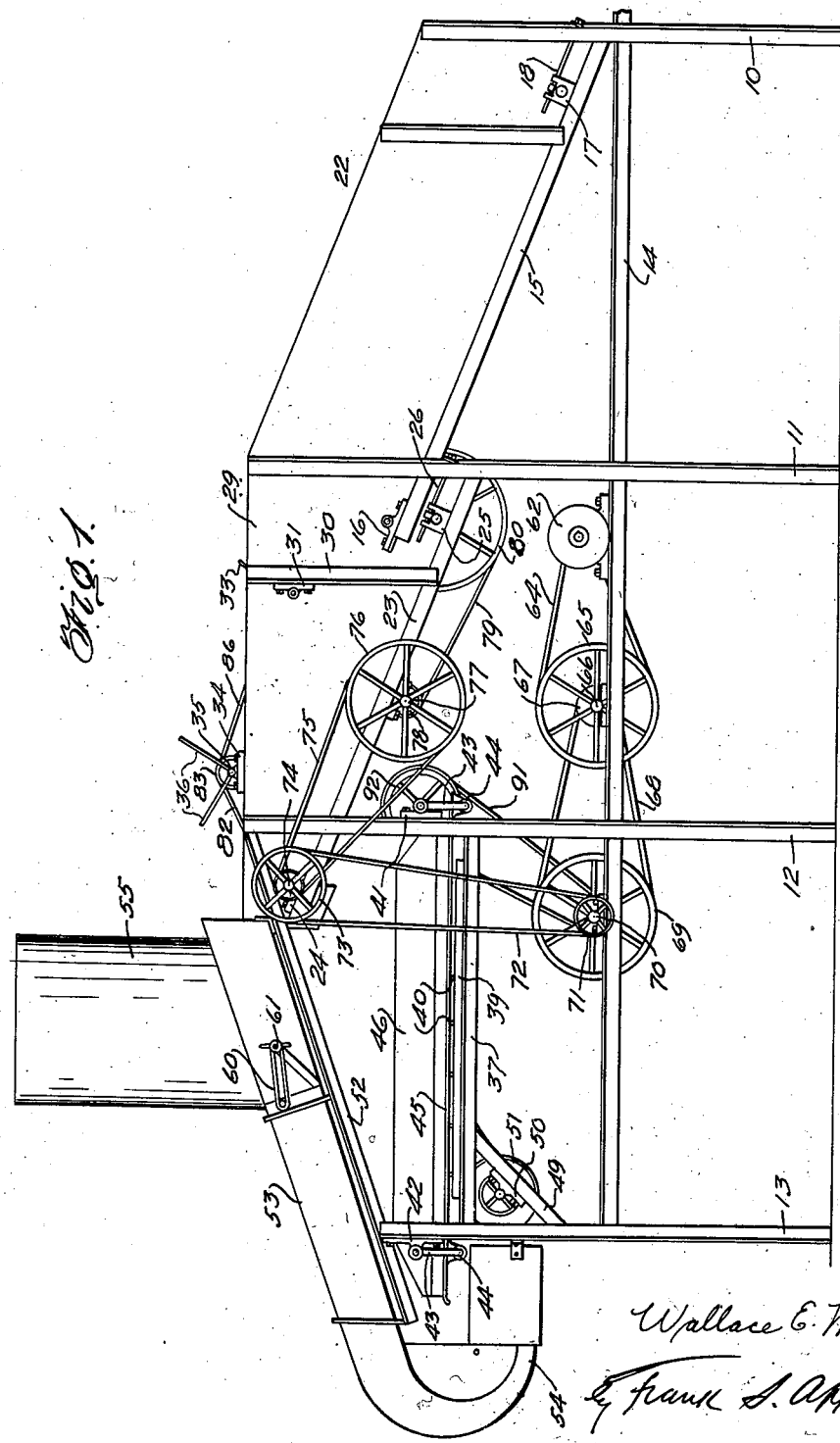

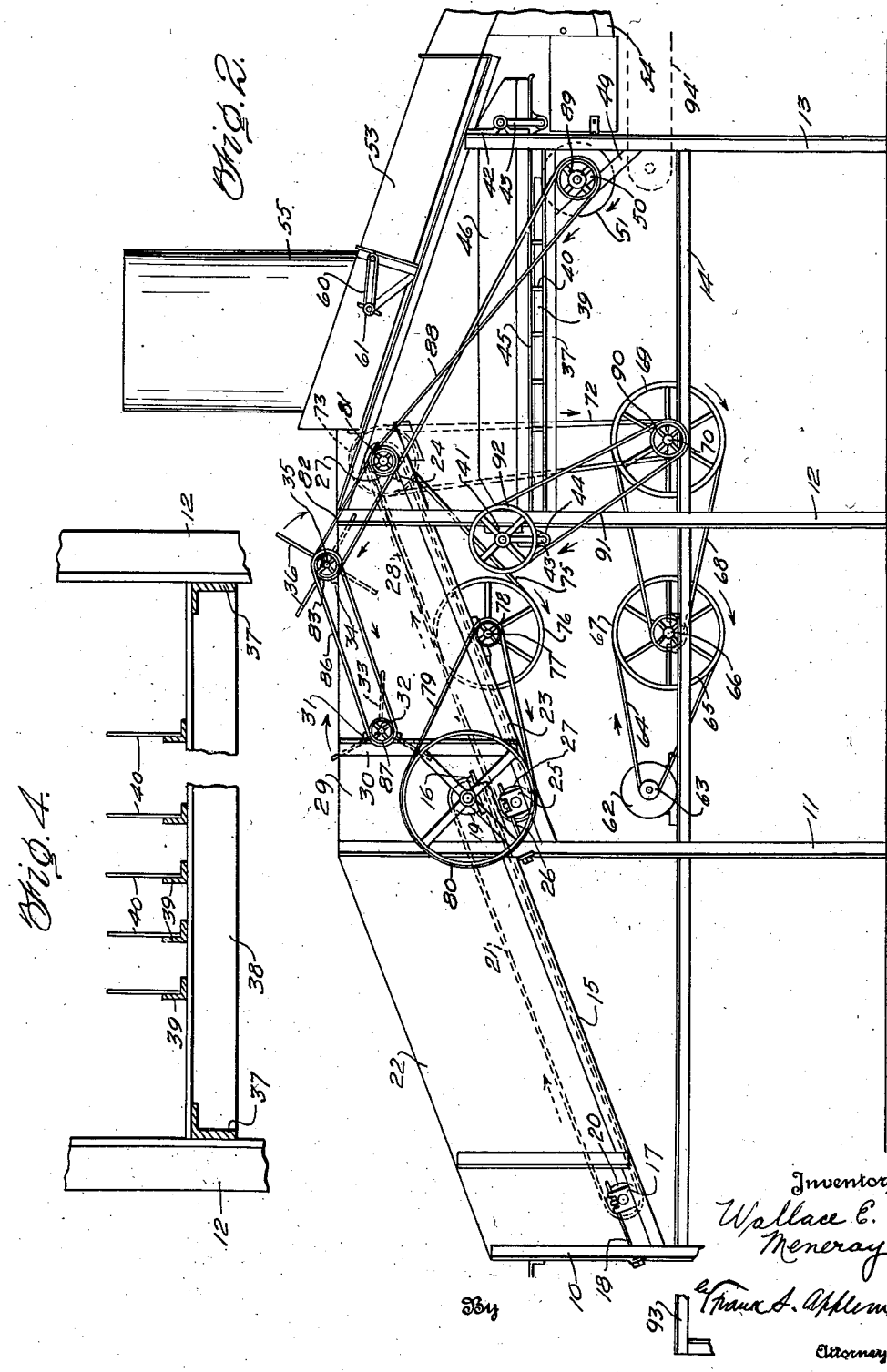

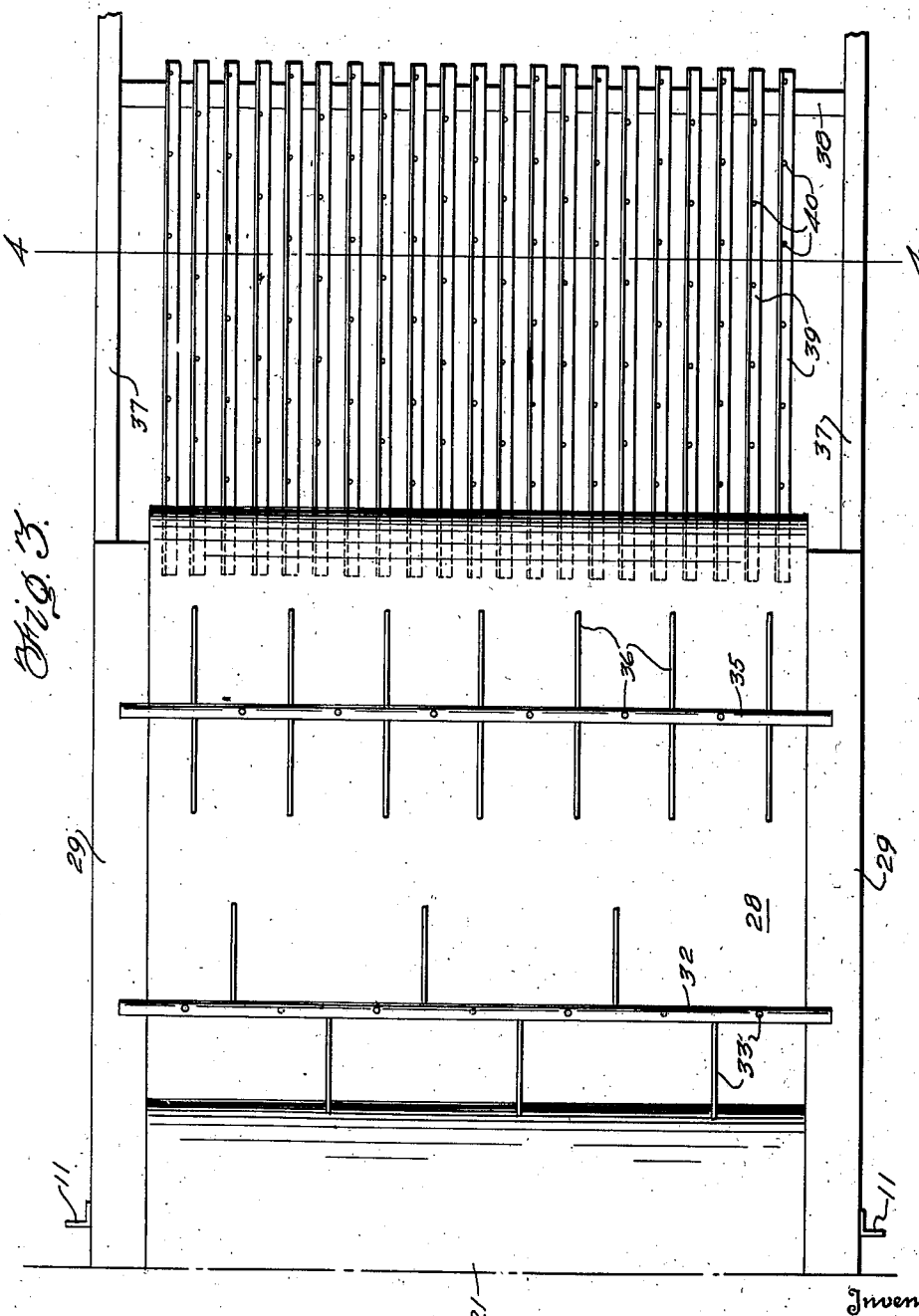

Patented Jan. 5, 1943

2,307,529

UNITED STATES PATENT OFFICE 2,307,529

BEAN GRADER AND SPREADER

Wallace E. Meneray, Orlando, Fla.

Application February 14, 1942, Serial No. 430,966

11 Claims. (Cl. 209—33)

This invention relates to bean graders and spreaders, and especially to a machine for spreading beans evenly and freeing the beans from trash so that they may pass in a wide, thin stream onto a picker belt where the culls may be picked by hand and discarded.

One object of the present invention is to provide a novel form of such a machine into which beans may be dumped in a compact mass and wherein the machine acts to feed the beans along in a gradually thinning layer.

A second object of the invention is to provide means for preventing all of the trash mixed with the beans from being carried along with the beans, the greater part of such trash being thrown back at the early part of the movement of the material through the machine.

A third object of the invention is to provide a machine for the purpose set forth, having means to rake or finger beans from the initial layer or mass and thereby effect even spreading of said beans.

A fourth object of the invention is to provide, in such a machine, a novel raking and spreading device for delivering the beans to a sorting belt.

A fifth object of the invention is to provide the machine with a novel air stream producing device for separating any trash remaining mixed with the beans from the latter just as they are delivered from the machine to fall on the sorting belt.

A sixth object of the invention is to provide means for heating the air stream above described and directing it through the bean stream to dry the beans.

With the above and other objects in view, the invention consists in general of certain novel details of construction and combinations of parts hereinafter fully described, illustrated in the accompanying drawings and particularly claimed.

In the accompanying drawings, like characters of reference indicate like parts in the several views, and:

Figure 1 illustrates a left side elevation of the invention;

Figure 2 illustrates a right side elevation of the machine with certain parts omitted to better show the working elements;

Figure 3 illustrates a plan view of certain parts of the machine;

Figure 4 illustrates an enlarged fragmentary section on the line 4—4 of Figure 3;

Figure 5 illustrates a detail fragmentary plan view of a certain hopper or tray used in this machine;

Figure 6 illustrates a fragmentary section on the line 6—6 of Figure 5 and showing the means for operating the tray;

Figure 7 illustrates a section similar to Figure 6 but showing the assembly of parts of the tray and rake device; and Figure 8 illustrates a transverse vertical section through the intake for the air used in this machine.

In the embodiment of the invention as herein disclosed there is provided a frame including pairs of laterally spaced uprights 10, 11, 12 and 13, the pairs 10 and 13 being at the ends of the machine and the pairs 11 and 12 being taller than the end pairs and longitudinally spaced at the middle portion of the machine. Longitudinal members 14 connect the uprights at each side. The uprights 10 and 11 have a pair of inclined bars 15 extending diagonally upward from the uprights 10 to the uprights 11. On the upper and forward end of these bars 15 are bearings 16, while adjacent the lower and rear ends of the bars 15 are slidably mounted bearings 17 adjustable by screws 18. Mounted in the bearings 16 is a roller 19 and a similar roller 20 is mounted in the bearings 17. Around the rollers 19 and 20 is trained a belt 21. Side walls 22 extend up from the bars 15 at each side. Similarly inclined bars 23 connect the uprights 11 and 12 with the lower ends of the bars 23 below the forward ends of the bars 15. Bearings 24 are arranged at the forward ends of the bars 23 and adjustable bearings 25 are mounted on the rear ends of these bars, the adjustment being effected by screws 26. Rollers 27 are mounted in the bearings 24 and 25 and a belt 28 is trained over these rollers. Walls 29 extend up from the bars 23.

Uprights 30 extend up from the bars 23 to the top of the walls 29 and are provided adjacent their upper ends with bearings 31. Journaled in the bearings 31 is a drum 32 from which radiate staggered fingers 33 extending well down toward the belt 28. On the walls 29, toward the forward end of the belt 28 are mounted bearings 34 wherein is journaled a drum 35 having radiating fingers 36 which also extend down toward the belt 28.

Extending between the uprights 12 and 13 are longitudinal frame members 37 and between the frame members 37 extend transverse frame members 38. Longitudinally extending parallel angle irons 39 are supported on top of the members and each of these angle irons carries a series of upright raker tines or pins 40, the pins of each angle iron being staggered with respect to the pins of the adjacent angle iron. Mounted on the members 12 are bearings 41 and similar bearings 42 are mounted on the members 13. In the bearings 41 and 42 are mounted depending crank members 43 which have their lower ends engaged in bearings 44 mounted on the under side of a trough floor 45 at the front and rear ends thereof. This trough floor is provided with upstanding sides 46 and is also provided with a series of longitudinal slots 47 through which the upper ends of the tines 40 may pass, the slots being provided with downwardly extending and flaring lips 48 to guide the tines into the slots.

Frame braces 49 connect the members 37 and 13 and carry bearings 50 in which is mounted a wire fabric drum 51. Diagonal members 52 connect the tops of the members 12 to the tops of the members 13. These members 52 support an air pipe 53 terminating in a recurved nozzle end 54 positioned to direct air against the forward face of the drum. At the upper end of the pipe 53 is a vertical intake 55 wherein is a fan 56 driven by an electric motor 57, the fan being arranged to draw air into the intake and force it through the pipe 53. A heating coil 58 is also provided in this intake. A flap valve 59 is arranged across the pipe 53 just forward of the intake and is controlled in position by lever arms 60 provided with suitable clamping means 61 to hold the valve in adjusted position.

Mounted on the frame is a motor 62 provided with a belt wheel 63 which is connected by a belt 64 with a large belt wheel 65 fixed on a jack shaft 66. On the shaft 66 is also fixed a small belt wheel 67 connected by a belt 68 with a large belt wheel 69 mounted on a shaft 70. On the left side of the machine (Fig. 1) the shaft 70 carries a small belt wheel 71 which is connected by a belt 72 with a belt wheel 73 fixed on the shaft of the drum or roller 27. This drum or roller shaft also carries a small belt wheel 74 which is connected by a belt 75 with a large belt wheel 76 fixed on a jack shaft 77 which extends across the machine and carries on its right hand end (Fig. 2) a small belt wheel 78. The wheel 78 is connected by a belt 79 with a large belt wheel 80 fixed on the shaft of the drum or roller 19. By the arrangement just described the speed of the belt 21 is greatly reduced below the speed of the belt 28. On the right hand end of the shaft of drum or roller 27 is a belt wheel 81 which is connected by a belt 82 with a belt wheel 83 carried by the shaft of the drum 35. The belt wheel 83 is also connected by a belt 86 with a belt wheel 87 carried by the shaft of the drum 32. The belt wheel 81 is also connected by a belt 88 with a belt wheel 89 on the shaft of the drum 51. On the right hand end of the shaft 70 is a belt wheel 90 connected by a belt 91 with a belt wheel 92 on one of the rear crank arms 43. By this last means the rear end of the floor 45 travels in a circular path, while the front end of said floor performs a simple oscillatory movement.

The various belts, wheels and drums travel in the directions indicated by the arrows in Figure 2.

A shelf 93 is arranged at the rear end of the machine and a take-off and picking belt 94 extends forwardly from beneath the front of the floor 45.

It will now be explained how the invention works, evenly spreading the beans or peas for grading and cleaning the beans or peas from trash, dust, sand and blossom ends. It will be noted that the shelf is to rest the hamper or box on while dumping the beans or peas onto the belt 21. This hopper or belt will hold from eight to twelve or fourteen bushels of beans or peas.

Concerning the speed with which the beans or peas can be graded over this invention, it will be noted that if the beans or peas are put in the hopper or belt 21 six inches deep level across it will spread sixty bushels an hour, and if placed twelve inches deep it will spread one hundred twenty bushels an hour. The speed of this belt is very slow, in that it travels about fourteen inches per minute, thus carrying the whole load at whatever depth being placed on the hopper or belt at such a speed that as it reaches the next belt it comes in contact with the circular driven rake turning fifteen revolutions per minute. This circular driven rake turns toward the beans or peas from the bottom up. It will be noted that the rake has alternating teeth four inches apart. This is used to finger the beans or peas out of the high pile so as to keep them from falling onto the other belt in a large pile.

The rollers of this first belt revolve at one and one-half revolutions per minute. The next belt 28 receives the material after the beans or peas have passed the first belt and moves faster on its rollers at the rate of sixty R. P. M. The second rake has its fingers going clear through and alternating. The purpose of this rake at this particular place is to prevent any pile of beans or peas that might drop off the first belt from going on into the spreader proper, and the second rake evens the beans or peas down to a depth no more than one inch. At this point the beans or peas have dropped on the hopper that delivers the beans or peas onto the grading belt.

The wire fingers 40 reach up in the hopper that has just received the beans or peas. At this point the rear end makes complete revolutions. The diameter on the left is say eight inches and on the front part it makes a swing four inches front of center and four inches back of center, or a total of eight inches. The beans and peas continuously run onto this hopper. As the back part revolves, the high part of the wire fingers is freed from the hopper and as it comes down onto the fingers they extend through the hopper three-quarters of an inch and move the beans or peas down toward the grading belt four inches and as they move down, there are four inches of beans spread on the grading belt which is taking the beans away. The grading belt is timed so that as the beans or peas are spread on the belt there are no vacant spaces or piling of beans or peas, thus giving an even spread continuously, regardless of how full the back belt is loaded, either at fifty or a hundred twenty-five bushels per hour, thereby eliminating the men whose function was the spreading on the beans or peas by hand on the old type belt.

The round stack 55 houses the fan which blasts sufficient air to clean all trash, dust, sand and blossom ends and other foreign matter from the beans or peas, thus eliminating pickers from the grading belt. When the beans or peas are wet or damp, and with the blast of air going on the beans or peas as they pass through the hopper, the air blast will dry them enough so that the beans or peas may be hampered ready for market without damage of mold. Heat may be applied to the top of the stack for more efficiently drying wet beans or peas.

The air pipe 53 extends down and around the end of the hopper. As the beans and peas, with the trash on them as they come from the field, pass through, a blast of air drives all the balance of the trash back to the wire cage 51 under the hopper and directly under the last wire fingers 40. This cage or drum turns to the right, thus carrying all of the trash over and back of the grading belt, which is fastened directly under this wire cage close enough to the wire cage so as not to rub. There is about one-eighth of an inch clearance at this point so as not to allow any beans or peas to slip under the cage and be lost in the trash. With the trash so eliminated as outlined before, the beans or peas are then passed on to be graded with the culls and spoiled ones to be picked and sorted out.

I claim:

1. In a bean and pea cleaner, a frame, a primary slow speed belt mounted in said frame, a secondary belt of relatively higher speed mounted in said frame and receiving material from the slow speed belt, a pair of revoluble rakes supported in said frame over the secondary belt and revolving backwardly with respect to the movement of the upper run of said secondary belt, a rocking and oscillating hopper having finger receiving slots in its bottom carried by the frame and positioned to receive material from the secondary belt fingers supported from said frame and positioned to enter said slots from below the oscillating hopper, a rotary screen beneath the forward end of the hopper, drive means for the belts, the rakes, the hopper and screen, and means to cause a flow of air against said screen.

2. In a bean and pea cleaner, a frame, a primary slow speed belt mounted in said frame, a secondary belt of relatively higher speed mounted in said frame and receiving material from the slow speed belt, a pair of revoluble rakes supported in said frame over the secondary belt and revolving backwardly with respect to the movement of the upper run of said secondary belt, a rocking and oscillating hopper having finger receiving slots in its bottom carried by the frame and positioned to receive material from the secondary belt, fingers supported from said frame and positioned to enter said slots from below the oscillating hopper, a rotary screen beneath the forward end of the hopper, guide means on the under side of the hopper directing the fingers through said slots, drive means for the belts, the rakes, the hopper and the screen, and means to cause a flow of air against said screen.

3. In a bean and pea cleaner, a frame, a primary slow speed belt mounted in said frame, a secondary belt of relatively higher speed mounted in said frame and receiving material from the slow speed belt, a pair of revoluble rakes supported in said frame over the secondary belt and revolving backwardly with respect to the movement of the upper run of said secondary belt, a rocking and oscillating hopper having finger receiving slots in its bottom carried by the frame and positioned to receive material from the secondary belt, fingers supported from said frame and positioned to enter said slots from below the oscillating hopper, a rotary screen beneath the forward end of the hopper, drive means for the belts, the rakes, the hopper and screen, and air blast means delivering air rearwardly against said screen.

4. In a bean and pea cleaner, a frame, a primary slow speed belt mounted in said frame, a secondary belt of relatively higher speed mounted in said frame and receiving material from the slow speed belt, a pair of revoluble rakes supported in said frame over the secondary belt and revolving backwardly with respect to the movement of the upper run of said secondary belt, a rocking and oscillating hopper having finger receiving slots in its bottom carried by the frame and positioned to receive material from the secondary belt, fingers supported from said frame and positioned to enter said slots from below the oscillating hopper, guide means on the under side of the hopper directing the fingers through said slots, a rotary screen beneath the forward end of the hopper, drive means for the belts, the rakes and the hopper, and air blast means delivering air rearwardly against said screen.

5. In a bean and pea cleaner, a frame, a primary slow speed belt mounted in said frame, a secondary belt of relatively higher speed mounted in said frame and receiving material from the slow speed belt, a pair of revoluble rakes supported in said frame over the secondary belt and revolving backwardly with respect to the movement of the upper run of said secondary belt, a rocking and oscillating hopper having finger receiving slots in its bottom carried by the frame and positioned to receive material from the secondary belt, fingers supported from said frame and positioned to enter said slots from below the oscillating hopper, a rotary screen beneath the forward end of the hopper, guide means on the under side of the hopper directing the fingers through said slots, drive means for the belts, the rakes, the hopper and the screen, and air blast means delivering air rearwardly against said screen.

6. In a bean and pea cleaner, a frame, a primary slow speed belt mounted in said frame, a secondary belt of relatively higher speed mounted in said frame and receiving material from the slow speed belt, a pair of revoluble rakes supported in said frame over the secondary belt and revolving backwardly with respect to the movement of the upper run of said secondary belt, a rocking and oscillating hopper having finger receiving slots in its bottom carried by the frame and positioned to receive material from the secondary belt, fingers supported from said frame and positioned to enter said slots from below the oscillating hopper, a rotary screen beneath the forward end of the hopper, drive means for the belts, the rakes, the hopper and screen, air blast means delivering air rearwardly against said screen, and heating means for said air blast.

7. In a bean and pea cleaner, a frame, a primary slow speed belt mounted in said frame, a secondary belt of relatively higher speed mounted in said frame and receiving material from the slow speed belt, a pair of revoluble rakes supported in said frame over the secondary belt and revolving backwardly with respect to the movement of the upper run of said secondary belt, a rocking and oscillating hopper having finger receiving slots in its bottom carried by the frame and positioned to receive material from the secondary belt, fingers supported from said frame and positioned to enter said slots from below the oscillating hopper, guide means on the under side of the hopper directing the fingers through said slots, a rotary screen beneath the forward end of the hopper and the hopper, air blast means delivering air rearwardly against said screen, and heating means for said air blast.

8. In a bean and pea cleaner, a frame, a primary slow speed belt mounted in said frame, a secondary belt of relatively higher speed mounted in said frame and receiving material from the slow speed belt, a pair of revoluble rakes supported in said frame over the secondary belt and revolving backwardly with respect to the movement of the upper run of said secondary belt, a rocking and oscillating hopper having finger receiving slots in its bottom carried by the frame and positioned to receive material from the secondary belt, fingers supported from said frame and positioned to enter said slots from below the oscillating hopper, a rotary screen beneath the forward end of the hopper, guide means on the under side of the hopper directing the fingers through said slots, drive means for the belts, the rakes, the hopper and the screen, air blast means delivering air rearwardly against said screen, and heating means for said air blast.

9. In a bean and pea cleaner, a frame, a primary slow speed belt mounted in said frame, a secondary belt of relatively higher speed mounted in said frame and receiving material from the slow speed belt, a pair of revoluble rakes supported in said frame over the secondary belt and revolving backwardly with respect to the movement of the upper run of said secondary belt, a rocking and oscillating hopper having finger receiving slots in its bottom carried by the frame and positioned to receive material from the secondary belt, fingers supported from said frame and positioned to enter said slots from below the oscillating hopper, a rotary screen beneath the forward end of the hopper, drive means for the belts, the rakes, the hopper and screen, air blast means delivering air rearwardly against said screen and down on said hopper, and heating means for said air blast.

10. In a bean and pea cleaner, a frame, a primary slow speed belt mounted in said frame, a secondary belt of relatively higher speed mounted in said frame and receiving material from the slow speed belt, a pair of revoluble rakes supported in said frame over the secondary belt and revolving backwardly with respect to the movement of the upper run of said secondary belt, a rocking and oscillating hopper having finger receiving slots in its bottom carried by the frame and positioned to receive material from the secondary belt, fingers supported from said frame and positioned to enter said slots from below the oscillating hopper, guide means on the under side of the hopper directing the fingers through said slots, a rotary screen beneath the forward end of the hopper, drive means for the belts, the rakes and the hopper, air blast means delivering air rearwardly against said screen and down on said hopper, and heating means for said air blast.

11. In a bean and pea cleaner, a frame, a primary slow speed belt mounted in said frame, a secondary belt of relatively higher speed mounted in said frame and receiving material from the slow speed belt, a pair of revoluble rakes supported in said frame over the secondary belt and revolving backwardly with respect to the movement of the upper run of said secondary belt, a rocking and oscillating hopper having finger receiving slots in its bottom carried by the frame and positioned to receive material from the secondary belt, fingers supported from said frame and positioned to enter said slots from below the oscillating hopper, a rotary screen beneath the forward end of the hopper, guide means on the under side of the hopper directing the fingers through said slots, drive means for the belts, the rakes, the hopper and the screen, air blast means delivering air rearwardly against said screen and down on said hopper, and heating means for said air blast.

WALLACE E. MENERAY.